US008773688B2

(12) United States Patent
Torii

(10) Patent No.: US 8,773,688 B2
(45) Date of Patent: Jul. 8, 2014

(54) LONG PRINTING MEDIA TAPE PRINTER COMPATIBLE WITH NETWORK CONNECTION

(75) Inventor: Kyosuke Torii, Handa (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1125 days.

(21) Appl. No.: 12/462,835

(22) Filed: Aug. 10, 2009

(65) Prior Publication Data

US 2010/0046025 A1 Feb. 25, 2010

(30) Foreign Application Priority Data

Aug. 25, 2008 (JP) ................................ 2008-214843

(51) Int. Cl.
*G06F 3/12* (2006.01)
*B41J 11/44* (2006.01)

(52) U.S. Cl.
USPC .............................. 358/1.15; 358/1.1; 400/76

(58) Field of Classification Search
None
See application file for complete search history.

(56) References Cited

U.S. PATENT DOCUMENTS

| | | | | |
|---|---|---|---|---|
| 7,370,093 | B2 | 5/2008 | Ohara | |
| 2002/0085870 | A1* | 7/2002 | Konishi et al. | 400/76 |
| 2003/0197886 | A1* | 10/2003 | Fujinaga et al. | 358/1.14 |
| 2005/0031393 | A1* | 2/2005 | Kishi et al. | 400/76 |
| 2005/0105104 | A1* | 5/2005 | Sakai et al. | 358/1.1 |
| 2005/0200313 | A1 | 9/2005 | Teradaira et al. | |
| 2008/0195725 | A1 | 8/2008 | Ohara | |
| 2008/0215712 | A1 | 9/2008 | Ohara | |
| 2008/0286024 | A1* | 11/2008 | Kajihara | 400/76 |

FOREIGN PATENT DOCUMENTS

| | | |
|---|---|---|
| CN | 1209593 | 3/1999 |
| CN | 1827386 | 9/2006 |
| CN | 1976360 | 6/2007 |
| JP | 10287023 | 10/1998 |
| JP | 11-272368 | 10/1999 |
| JP | 2001-228937 | 8/2001 |
| JP | 2003-264556 | 9/2003 |
| JP | 2005-250739 | 9/2005 |
| JP | 2006-051047 | 2/2006 |
| JP | 2007008069 | 1/2007 |

OTHER PUBLICATIONS

Chinese Office Action issued in Chinese Application No. 200910168855.4 on Jan. 4, 2013.

* cited by examiner

*Primary Examiner* — Vincent Rudolph
(74) *Attorney, Agent, or Firm* — McCarter & English, LLP

(57) ABSTRACT

A CPU in a control circuit part powers off a tape printer when a pressing signal is continuously input from a power switch during a predetermined time on condition that the tape printer is connected to a LAN, in other words, on condition that a LAN connection signal is input from a communication control circuit part. Also, the CPU powers off the tape printer at the almost same time when the pressing signal is input from the power switch on condition that the tape printer is not connected to the LAN, in other words, on condition that the LAN connection signal is not input.

8 Claims, 6 Drawing Sheets

LONG PRINTING MEDIA TAPE PRINTER COMPATIBLE WITH NETWORK CONNECTION

CROSS REFERENCE TO RELATED APPLICATIONS

The present application claims priority from Japanese Patent Application No. JP 2008-214843, which was filed on Aug. 25, 2008, the disclosure of which is incorporated herein by reference in its entirety.

TECHNICAL FIELD

The disclosure relates to a tape printer that prints print data on a long printing medium.

BACKGROUND

Conventionally, several methods have been introduced for connecting a tape printer or the like to a network.

For example, as described in Japanese Patent Publication No. 2003-264556, to each tape printer 10*a*, 10*b* connectable to a network (LAN), there are given an individual Media Access Control address (MAC address), as well as an IP address 192.0.0.192, a subnet mask 0.0.0.0 and a gateway address 0.0.0.0 as default addresses before shipped. If connected to the LAN and switched on, each tape printer 10*a*, 10*b* communicates with a personal computer 3 (server) as an address assigning apparatus on Simple Network Management Protocol (SNMP). Then, each tape printer 10*a*, 10*b* acquires a new IP address, a new subnet mask, and a new gateway address so as to newly assign itself those addresses. Next, each tape printer 10*a*, 10*b* prints print data transmitted from the personal computer 3 or the like, through the LAN by using a communication system like TCP/IP.

However, with the structure disclosed in the above-mentioned Japanese Patent Publication No. 2003-264556, once powered-off and thereafter newly powered on, each tape printer 10*a*, 10*b* connected to the network has to communicate with the server on the LAN on SNMP etc., so as to re-acquire an IP address, a subnet mask, a gateway address or the like from the server. Therefore, it takes a long time to re-start each tape printer 10*a*, 10*b*. For example, in a situation where each tape printer 10*a*, 10*b* is a network equipment which can communicate with the network on Dynamic Host Configuration Protocol (DHCP), Bootstrap Protocol (BOOHP) and Reverse Address Resolution Protocol (RARP), and is configured to ask on each protocol in this order, if only the RARP server is working on the LAN when powered on, the equipment has to wait until respective time-out time elapse for asking to the DHCP server and the BOOTP server. This is unnecessary time to wait. Further, communications for re-acquisition of an IP address, a subnet mask, a gateway address or the like generate packets in the network, which increases the traffic.

On the other hand, when each tape printer 10*a*, 10*b* is directly connected to other apparatus (like a personal computer), data communication quantity when each tape printer 10*a*, 10*b* is powered on is smaller. Therefore, it takes less time for re-starting of each tape printer 10*a*, 10*b*. So, if each tape printer 10*a*, 10*b* is configured to be powered off on condition that a power switch is continuously pressed for a predetermined time, or if configured to provide a power switch at a position difficult to operate, it is time-consuming or troublesome to power off each tape printer 10*a*, 10*b*.

SUMMARY

The disclosure has been made to solve the above-described problem and has an object to provide a tape printer in which unnecessary cuttings of a power source while the tape printer is connected to a network can be prevented, and which can be easily powered off while used under being connected to other apparatus.

To achieve the purpose of the disclosure, there is provided a tape printer comprising: a print device for printing print data on a long printing medium; a connection device capable of connecting to a network; an input device for inputting a power-off instruction to instruct power-off of the tape printer; a first judgment device for judging whether the tape printer is connected to the network through the connection device when the power-off instruction is input from the input device; a second judgment device for judging whether the power-off instruction is continuously input during a predetermined time when the first judgment device judges that the tape printer is connected to the network; and a power source control device for powering off the tape printer when the second judgment device judges that the power-off instruction is continuously input during the predetermined time.

In the tape printer mentioned above, the power source control device powers off the tape printer when the power-off instruction is continuously input during the predetermined time, for example, when a power switch or the like is kept in a depressed state during the predetermined time, on condition that the tape printer is connected to the network. Thereby, a user has to keep pressing the power switch or the like during the predetermined time to power-off the tape printer on condition that the tape printer is connected to the network. So, unnecessary cuttings of the power source while the tape printer is connected to the network can be effectively prevented. Therefore, a number of times of power-on operations while the tape printer is connected to the network can be reduced. As a result, the amount of communication with the server on the network can be reduced, and the traffic can be reduced.

The input device can be arranged at a position easy to operate, thereby the operability of the tape printer can be improved.

According to another aspect of the disclosure, there is provided a tape printer in which print data are printed on a long tape through a print head, the tape printer comprising: a power switch for powering on or off the tape printer; a first connection device capable of connecting to a network; a timer device for counting a predetermined time since the power switch is pressed; and a controller programmed to (a) judge whether the tape printer is connected to the network through the first connection device, (b) power off the tape printer after the timer device counts the predetermined time if judged that the tape printer is connected to the network and (c) power off the tape printer immediately if judged that tape printer is not connected to the network.

In the above tape printer, the controller powers off the tape printer after the timer device counts the predetermined time if judged that the tape printer is connected to the network and powers off the tape printer immediately if judged that tape printer is not connected to the network. Thereby, since the tape printer is powered off only after the timer device counts the predetermined time when the tape printer is connected to the network, unnecessary cuttings of the power source while the tape printer is connected to the network can be prevented. Therefore, a number of times of power-on operations while the tape printer is connected to the network can be reduced. As a result, the amount of communication with the server on the network can be reduced and the traffic can be reduced.

DETAILED DESCRIPTION

A detailed description of an exemplary embodiment of a tape printer embodying the disclosure will now be given referring to the accompanying drawings.

First Embodiment

First, the schematic structure of a tape printer loaded with a rolled sheet holder according to a first embodiment will be described based on FIG. 1 to FIG. 3.

Figure 1:
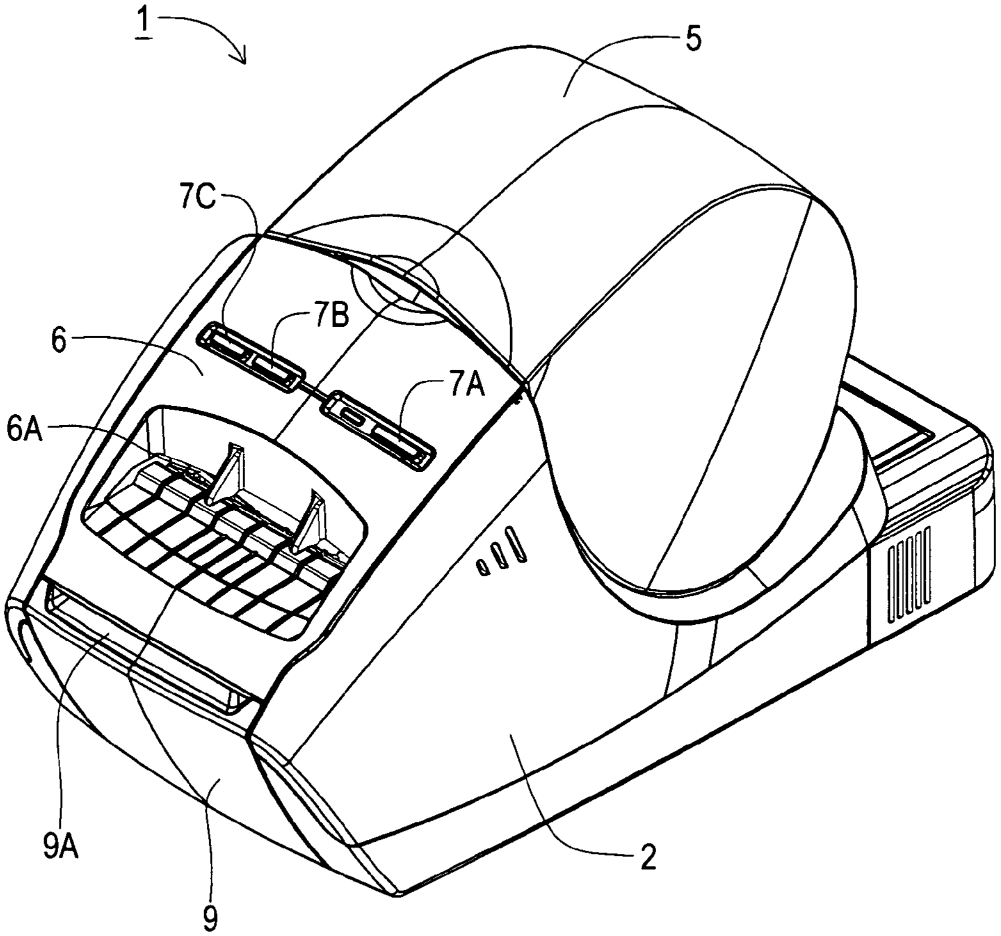
FIG. 1 is a perspective view showing an appearance of a tape printer of a first embodiment as seen from a front face thereof.
Figure 2:
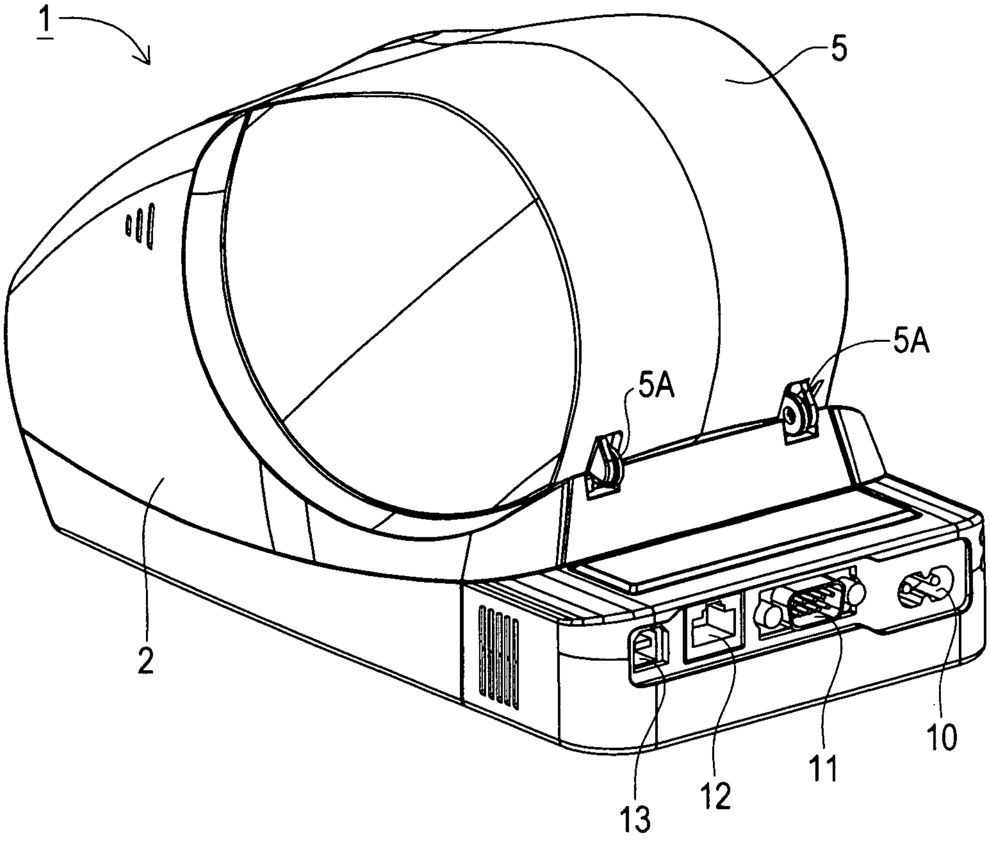
FIG. 2 is a perspective view showing an appearance of the tape printer of the first embodiment as seen from a rear face thereof.
Figure 3:
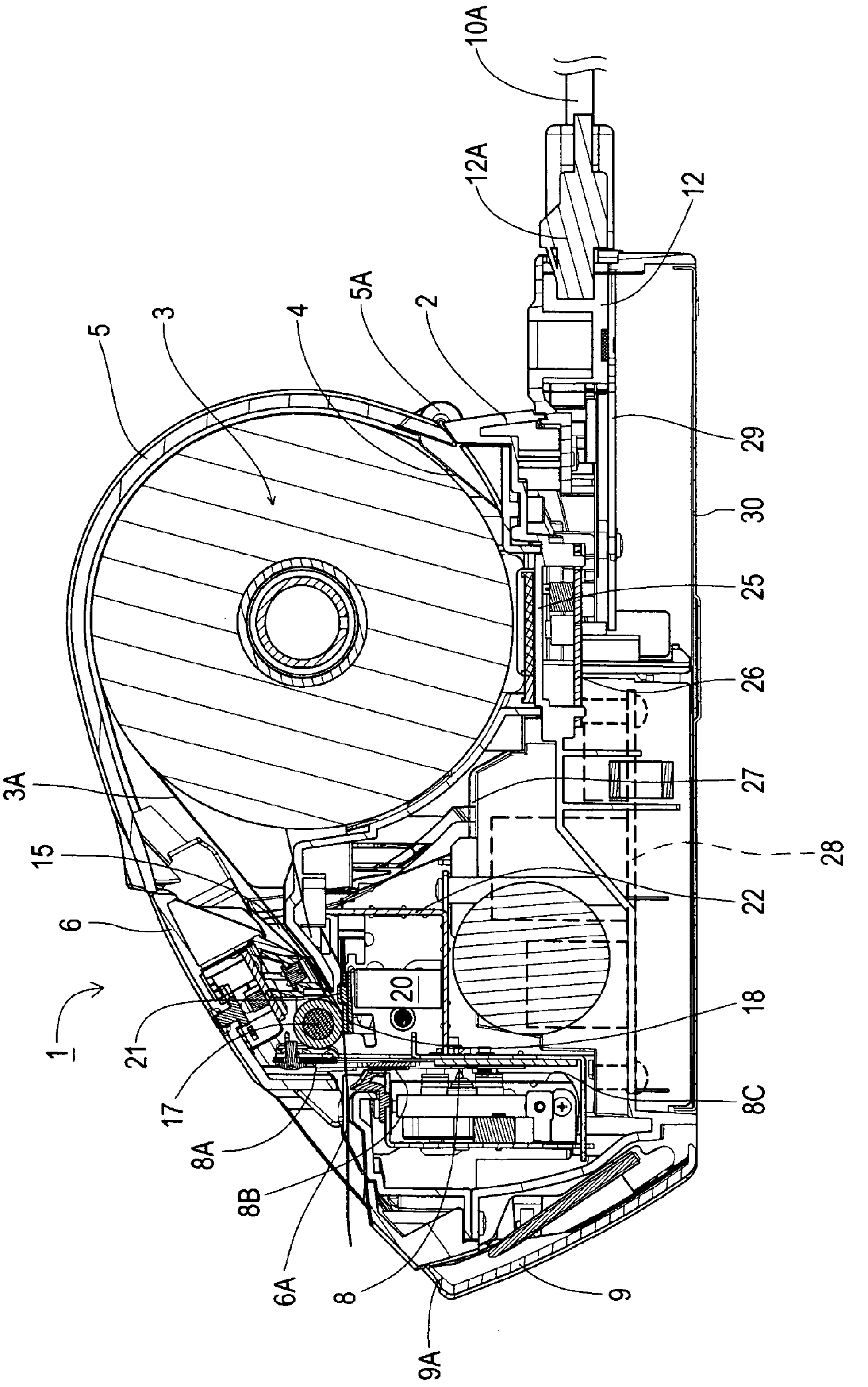
FIG. 3 is a side sectional view showing a condition in which a rolled sheet holder is loaded in the tape printer of the first embodiment.

As shown in FIG. 1 to FIG. 3, a tape printer 1 includes a resin body case 2, a rolled sheet holder 3, a rolled sheet holder housing section 4 and a top cover 5 which covers the upper side of the rolled sheet holder housing section 4. The rolled sheet holder housing section 4 houses the rolled sheet holder 3 with a rolled sheet 3A of a prescribed width being wound thereon. The top cover 5 is made of transparent resin and formed in a substantially semicircular shape in side view. The top cover 5 is supported pivotally by a pair of cover shaft members 5A fixed to rear upper edge parts of the rolled sheet holder housing section 4, so that it can move back and forth rotationally in a freely openable manner. The rolled sheet 3A may be a long heat-sensitive sheet (so called, thermal paper) having self color development characteristics, a long label sheet made by adhering the heat-sensitive sheet and a release sheet together, or the like, and is wound up on the rolled sheet holder 3.

On a front cover 6 at a front side of the top cover 5, there is formed a sheet discharging port 6A through which the printed rolled sheet 3A is discharged outside. A power switch 7A, a cut switch 7B and a feed switch 7C are arranged in a substantially horizontal manner at an upper portion of the front cover 6. Upon being pressed, the cut switch 7B drives a cutter unit 8 (refer to FIG. 3) provided inside the sheet discharging port 6A to cut off the rolled sheet 3A. While being pressed, the feed switch 7C discharges the rolled sheet 3A in a conveying direction.

Here, as shown in FIG. 3, the cutter unit 8 is composed of a fixed blade 8A and a movable blade 8B formed in a V-shape, in front view. The movable blade 8B is operated to move in a vertical direction by a cutting motor 8C including a DC motor or the like when the cut switch 7B is pressed. Being cut by the fixed blade 8A and the movable blade 8B, the rolled sheet 3A is discharged outside from the sheet discharging port 6A.

A tray member 9 is fixed to a lower edge part of the front cover 6 in a freely openable manner so as to cover the front side of the front cover 6. The tray member 9 can be opened by placing a finger on a recess part 9A formed at an upper edge part thereof so as to make the tray member 9 move rotationally frontward.

At a rear part of the body case 2, an inlet 10 to which a power cord 10A (refer to FIG. 3) can be connected is provided. At a side part (the left side in FIG. 2) thereof, an RS-232C connector part 11 to which other apparatus like a personal computer 200 (refer to FIG. 4) can be directly connected is provided.

Next to the RS-232C connector part 11 (the left side thereof in FIG. 2), a LAN connector part 12 to which a LAN cable 12A (refer to FIG. 3) can be connected is provided. Then, the tape printer 1 is configured to be connectable to a Local Area Network (LAN) 51 (refer to FIG. 4) through the LAN cable 12A connected to the LAN connector part 12. So, the tape printer 1 can communicate with a server 100 (refer to FIG. 4), which acts as an address assigning apparatus.

Next to the LAN connector part 12 (the left side thereof in FIG. 2), a USB (Universal Serial Bus) connector part 13 to which other apparatus like the personal computer 200 (refer to FIG. 4) can be directly connected is provided.

Also, as shown in FIG. 3, a platen roller 17 is supported in a freely rotatable manner at a more downstream side than an insertion opening 15 with reference to the conveying direction of the rolled sheet 3A. The rolled sheet 3A is inserted into the insertion opening 15. A thermal head 18 is fixed on an upper surface of a head support member 21 biased upward by a pressure sensitive spring 20. An upstream-side edge part of the head support member 21 with reference to the conveying direction is supported with a rear side of a frame 22 so as to allow swinging thereof in a vertical direction.

When the top cover 5 is closed, the thermal head 18 biased upward by the pressure sensitive spring 20 through a linkage mechanism not shown depresses the rolled sheet 3A against the platen roller 17, whereby a printable state is obtained.

When the top cover 5 is opened, the thermal head 18 separates from the platen roller 35 through the linkage mechanism not shown. And then, the rolled sheet 3A fed from the insertion opening 15 can be inserted between the platen roller 17 and the thermal head 18.

Below the rolled sheet holder housing section 4, there is provided, through a dividing wall 25, a control board 26 on which a control circuit part 31(refer to FIG. 4) is formed. The control circuit part 31 drivingly controls each mechanism such as the thermal head 18, etc., in response to commands from the external server 100 and the personal computer 200 or the like. Also, below the flame 22, there is provided, through a dividing wall 27, a power board 28 on which a power circuit part 32 (refer to FIG. 4) is formed.

Below the control board 26, there is provided a communication control board 29 on which a communication control circuit part 33 (refer to FIG. 4) is formed. The communication control circuit part 33 controls communication with the external server 100 and the personal computer 200 or the like. To the communication control board 29, the RS-232C connector part 11, the LAN connector part 12 and the USB connector part 13 each are electrically connected. Also, the control board 26, the power board 28 and the communication control board 29 are covered with a bottom cover 30 made of a thin steel sheet (in the present embodiment, a steel sheet such as SPCC approximately 0.5 mm thick) fastened to the bottom by screws.

Next, the control configuration of the tape printer 1 constituted as above will now be described based on FIG. 4.

Figure 4:
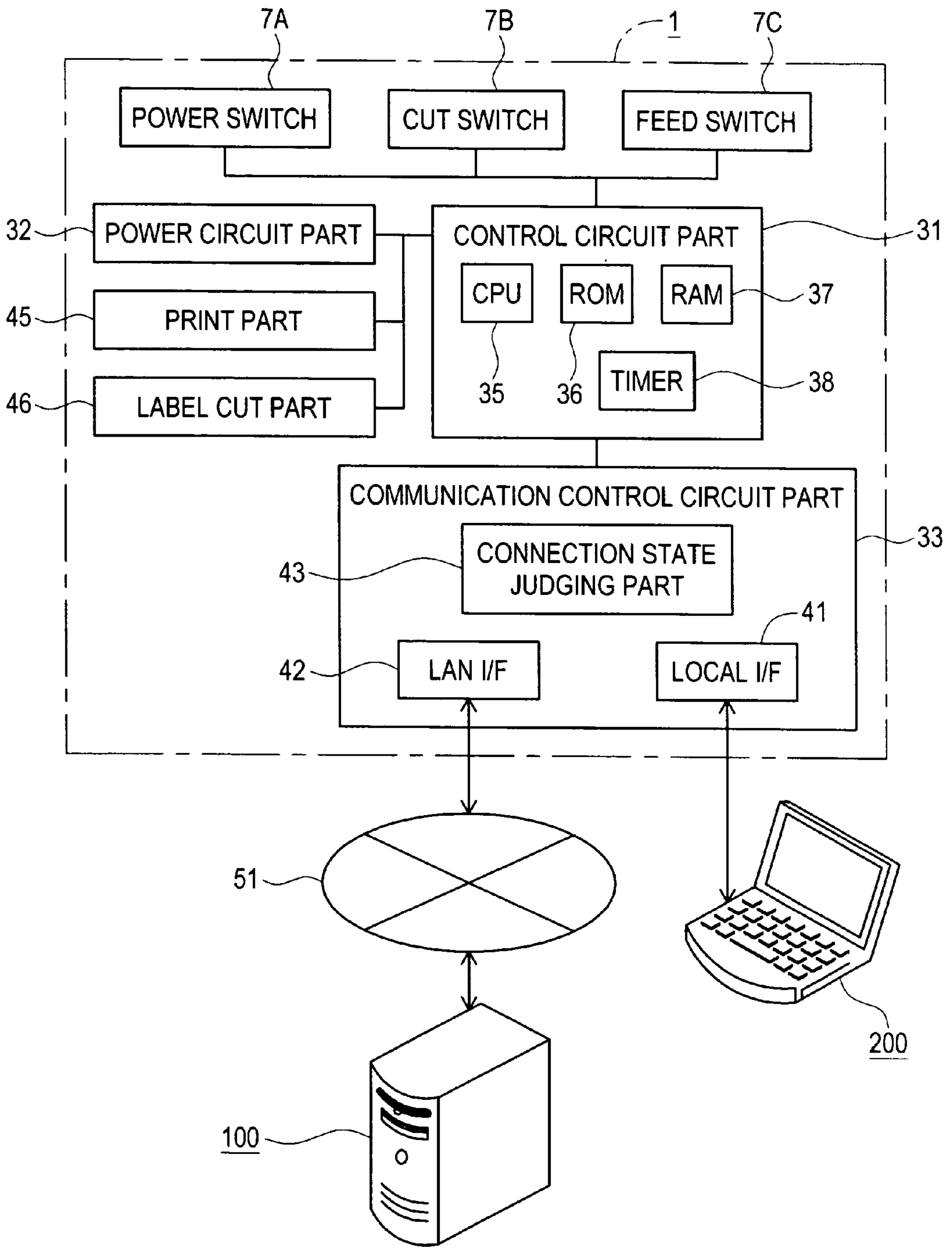
FIG. 4 is a block diagram showing control correlations with respect to the tape printer.

As shown in FIG. 4, the tape printer 1 comprises the control circuit part 31 which drivingly controls mechanisms of the entire tape printer 1 such as the thermal head 18, the power circuit part 32, the communication control circuit part 33, a print part 45, a label cut part 46 and the like. To the control circuit part 31, the power switch 7A, the cut switch 7B and the feed switch 7C are electrically connected. So, when each switch 7A through 7C is pressed, each pressed signal is input to the control circuit part 31.

The control circuit part 31 has a CPU 35 as a calculating and control apparatus for controlling the entire tape printer 1, a ROM 36, a RAM 37, a timer 38 for measuring time, etc. Also, the CPU 35, the ROM 36, the RAM 37 and the timer 38 are interconnected through bus lines not shown, whereby data are mutually exchanged.

The ROM 36 stores various programs essential for controlling the tape printer 1, such as a printing control program, a power-off process program and the like. Especially, the power-off process program which will be described later is to disconnect the power circuit part 32 when the power switch 7A is pressed, that is to say, to power-off the tape printer 1. The CPU 35 executes various kinds of calculations and controls in accordance with the various programs stored in the ROM 36.

The ROM 36 stores outline data related to a large number of individual characters for defining their respective outlines. The outline data are classified by typefaces (Gothic typeface, Mincho typeface, and the like), in correlation to code data. Dot pattern data of a character is extracted to an image buffer in accordance with the corresponding outline data.

The RAM 37 temporarily stores results of various operations performed by the CPU 35. Print data are stored temporarily when printing on the rolled sheet 3A is carried out by the thermal head 18. Further, in the RAM 37, various types of memories such as a text memory, an image buffer, a print buffer and the like are provided.

Power source voltage like AC100V is supplied through the line code 10A connected to the inlet 10. The power circuit part 32 converts the power source of AC100V or the like into approximately DC5V, DC12V, etc., through a regulator not shown and the like. Then the power circuit part 32 provides thus converted power source to the control circuit part 31, the communication control circuit part 33, the print part 45, the label cut part 46, and the like. Further, the power circuit part 32 is configured to turn on and off the power source to the control circuit part 31, the communication control circuit part 33, the print part 45, the label cut part 46, etc., according to an on signal and an off signal received from the control circuit part 31.

The communication control circuit 33 has a local interface (I/F) 41, a LAN interface (I/F) 42, a connection state judging part 43, a not shown CPU, a not shown RAM, a not shown ROM, etc. To the local I/F 41, the RS-232C connector part 11 and the USB connector part 13 are connected. Also, to LAN I/F 42, the LAN connector part 12 is connected.

The connection state judging part 43 detects whether the local I/F 41 is connected to other apparatus such as the personal computer 200 through the RS-232C connector part 11 or through the USB connector part 13. If the local I/F 41 is connected to other apparatus, the connection state judging part 43 outputs a local connection signal. Further, the connection state judging part 43 detects whether the LAN I/F 42 is connected to the LAN 51 through the LAN cable 12A connected to the LAN connector part 12. If the LAN I/F 42 is connected to the LAN 51, the connection state judging part 43 outputs a LAN connection signal. Then, the communication control circuit part 33 outputs the local connection signal and the LAN connection signal, output by the connection state judging part 43, to the control circuit part 31.

The communication control circuit part 33 stores a MAC address. In case the connection state judging part 43 outputs the LAN connection signal after start-up of the tape printer 1, the communication control circuit part 33 acquires an IP address, a subway mask, a gateway address or the like from the server 100 as the address assigning apparatus on the LAN 51 based on SNMP. On the other hand, the control circuit part 31 is configured to wait for predetermined time (for example about 30 sec.) until receiving a completing signal in case of receiving the LAN connection signal from the communication control circuit part 33 after start-up of the tape printer 1. Here, the completing signal is a signal input from the communication control circuit part 33 when the acquisition of the IP address, the subnet mask and the gateway address is completed.

The communication control circuit part 33 obtains print data from external machines like the server 100 on the LAN 51 connected to the LAN I/F 42 by using a communication system like TCP/IP. The communication control circuit part 33 also obtains print data from other apparatus like the personal computer 200 connected to the local I/F 41. Then, the communication control circuit part 33 outputs print data obtained from such external machines and other apparatus to the control circuit part 31, as well as outputs information on operation states of the tape printer 1 to external machines like the server 100 and other apparatus like the personal computer 200 under the direction of the control circuit part 31.

The print part 45 drivingly controls a not shown sheet feed motor that rotationally drives the platen roller 17 and the thermal head 18 according to print data received from the control circuit part 31. Thereby, the print part 45 can print label data on the rolled sheet 3A.

The label cut part 46 drivingly controls the cutting motor 8C and moves the movable blade 8B up and down according to cutting instructions received from the control circuit part 31. And thus, the label cut part 46 cuts off the printed rolled sheet 3A.

(Power-Off Process)

Next, there will be described on a power-off process to disconnect the power circuit part 32 by using the power switch 7A in thus configured tape printer 1, in short, to power-off the tape printer 1 based on FIG. 5. The program shown as a flowchart in FIG. 5 is repeatedly executed with a prescribed length of interval (about 100 milli-seconds in the present embodiment, for example) by the CPU 35 in the control circuit part 31.

Figure 5:
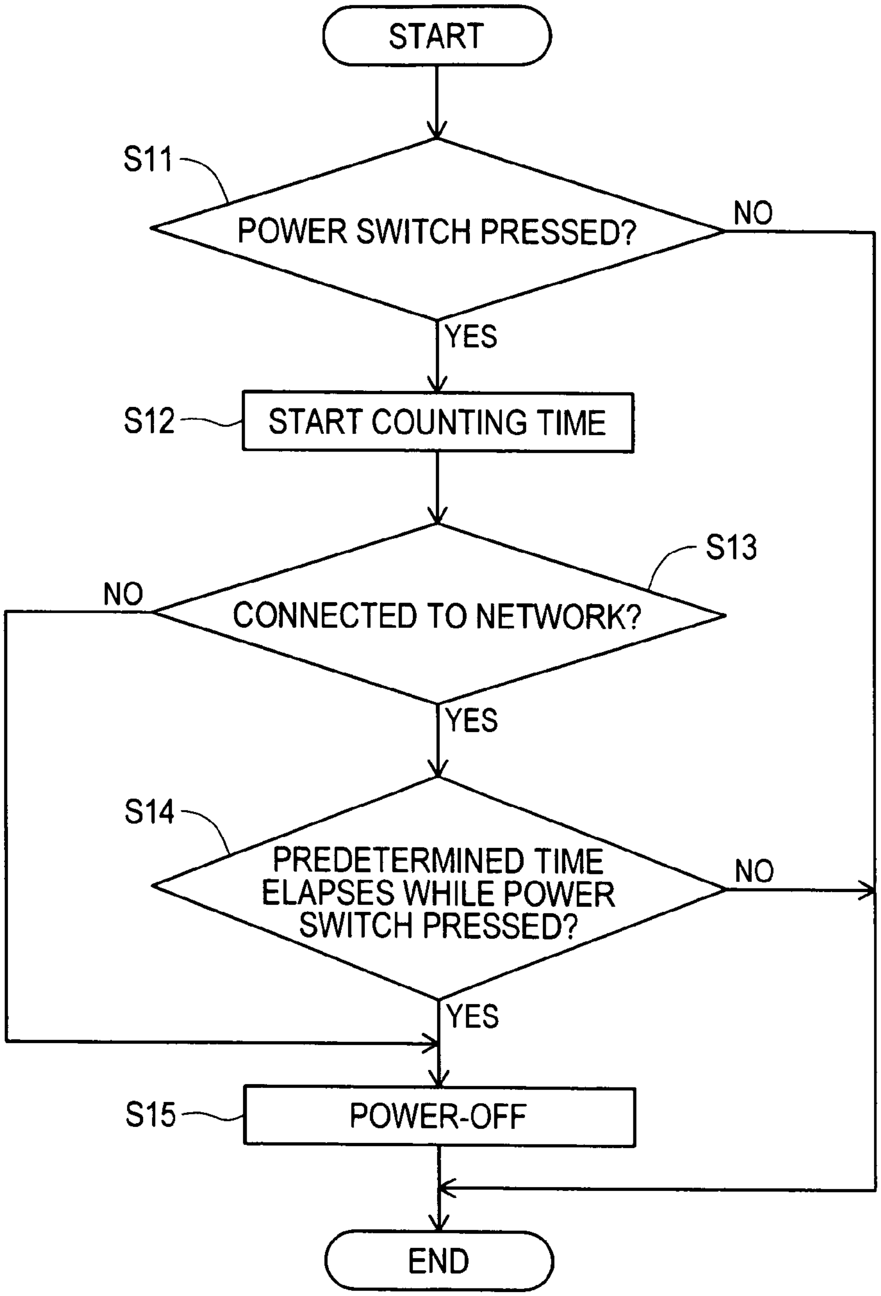
FIG. 5 is a flowchart illustrating a "power-off process" to power-off the tape printer of the first embodiment.

As shown in FIG. 5, at step (hereinafter referred to as S) 11, the CPU 35 carries out a judgment process to judge whether the power switch 7A has been pressed or not, that is to say, whether a pressing signal has been input from the power switch 7A or not. If the power switch 7A has not been pressed, that is to say, if the pressing signal has not been input from the power switch 7A (S11: NO), the CPU 35 finishes the process thereat.

On the other hand, if the power switch 7A has been pressed, in other words, if the pressing signal has been input from the power switch 7A (S11: YES), the CPU 35 shifts the flow to process S12. At S12, the CPU 35 makes the timer 38 start counting the elapse of time after the pressing signal 7A is input.

Next, at S13, the CPU 35 carries out a judgment process to judge whether the tape printer 1 is connected to the LAN 51 through the LAN cable 12A connected to the LAN connector part 12. That is to say, the CPU 35 judges whether the LAN connection signal is input from the communication control circuit part 33.

If the tape printer 1 is not connected to the LAN 51 through the LAN cable 12A connected to the LAN connector part 12, that is to say, if the LAN connection signal is not input from the communication control circuit part 33 (S13:NO), the CPU 35 shifts the flow to process S15 which will be mentioned later.

On the other hand, if the tape printer 1 is connected to the LAN 51 through the LAN cable 12A connected to the LAN connector part 12, that is to say, if the LAN connection signal is input from the communication control circuit part 33 (S13: YES), the CPU35 shifts the flow to process S14.

At S14, the CPU 35 carries out a judgment process to judge whether the power switch 7A is kept in a depressed state during a predetermined time (for example, about 5 sec.). That is, the CPU 35 continues to read time the timer 38 keeps counting with a prescribed length of interval (for example, about 100 milli-sec.) every cycle while the pressing signal is continuously input from the power switch 7A so as to judge whether the continuous time counted by the timer 38 has attained the predetermined time (for example, about 5 sec.).

If the predetermined time (for example, about 5 sec.) does not elapse in the state that the power switch 7A is continuously pressed, the CPU 35 finishes the process thereat. That is to say, if the input of the pressing signal from the power switch 7A is discontinued before the time counted by the timer 38 attains the predetermined time (for example, about 5 sec.) (S14: NO), the CPU 35 finishes the process.

On the other hand, if the predetermined time (for example, about 5 sec.) elapses in the state that the power switch 7A is continuously pressed, that is to say, if the time counted by the timer 38 attains the predetermined time (for example, about 5 sec.) (S14:YES), the CPU 35 shifts the flow to process S15.

At S15, after outputting an OFF signal to the power circuit part 32, the CPU 35 finishes the process thereat. The OFF signal is for instructing the power circuit part 32 to power off the tape printer 1, in other word, to cut the power source to the control circuit part 31, the communication control circuit part 33, the print part 45, the label cut part 46 and the like. Thereby, the power circuit part 32 cuts the power source to the control circuit part 31, the communication control circuit part 33, the print part 45, the label cut part 46 and the like, in the direction of the OFF signal received from the control circuit part 31.

As was described earlier in detail, in the tape printer 1 of the present embodiment, the CPU 35 in the control circuit part 31 powers off the tape printer 1 when the pressing signal is continuously input from the power switch 7A during the predetermined time (for example, about 5 sec.) on condition that the tape printer 1 is connected to the LAN 51, in other words, on condition that the LAN connection signal is input from the communication control circuit part 33. Also, the CPU 35 powers off the tape printer 1 at the almost same time when the pressing signal is input from the power switch 7A on condition that the tape printer 1 is not connected to the LAN 51, in other words, on condition that the LAN connection signal is not input.

On account of this, a user has to keep pressing the power switch 7A or the like during the predetermined time to power-off the tape printer 1 on condition that the tape printer 1 is connected to the LAN 51. Therefore, unnecessary cuttings of the power source while the tape printer 1 is connected to the network can be effectively prevented. Therefore, a number of times of power-on operations while the tape printer 1 is connected to the LAN 51 can be reduced. As a result, the amount of communication with the server 100 on the LAN 51 can be reduced, and the traffic can be reduced.

The tape printer 1 can be configured to cut the power source as soon as the power switch 7A is pressed in case not connected to the LAN 51. Thereby, the power source can be cut promptly. The power switch 7A can be arranged at the front cover 6, thereby the operability of the tape printer 1 can be improved.

Second Embodiment

Next, a tape printer 61 of the second embodiment will be described based on FIG. 6. In the description below, as to composing elements the same as or equivalent to those in the tape printer 1 of the first embodiment directed to FIGS. 1 through 5, numerals the same in the tape printer 1 are assigned to the composing elements of the tape printer 61.

The schematic structure of the tape printer 61 is almost the same as that of the tape printer 1 of the first embodiment. Also, almost all kinds of control processes of the tape printer 61 are the same as those of the tape printer 1.

However, the only difference lies in the ‘power-off process’ to disconnect the power circuit part 32 when the power switch 7A is pressed, in short, to power off the tape printer 61.

(Power-Off Process)

Here, the ‘power-off process’ to power off the tape printer 61 of the second embodiment will be described based on the FIG. 6.

Figure 6:
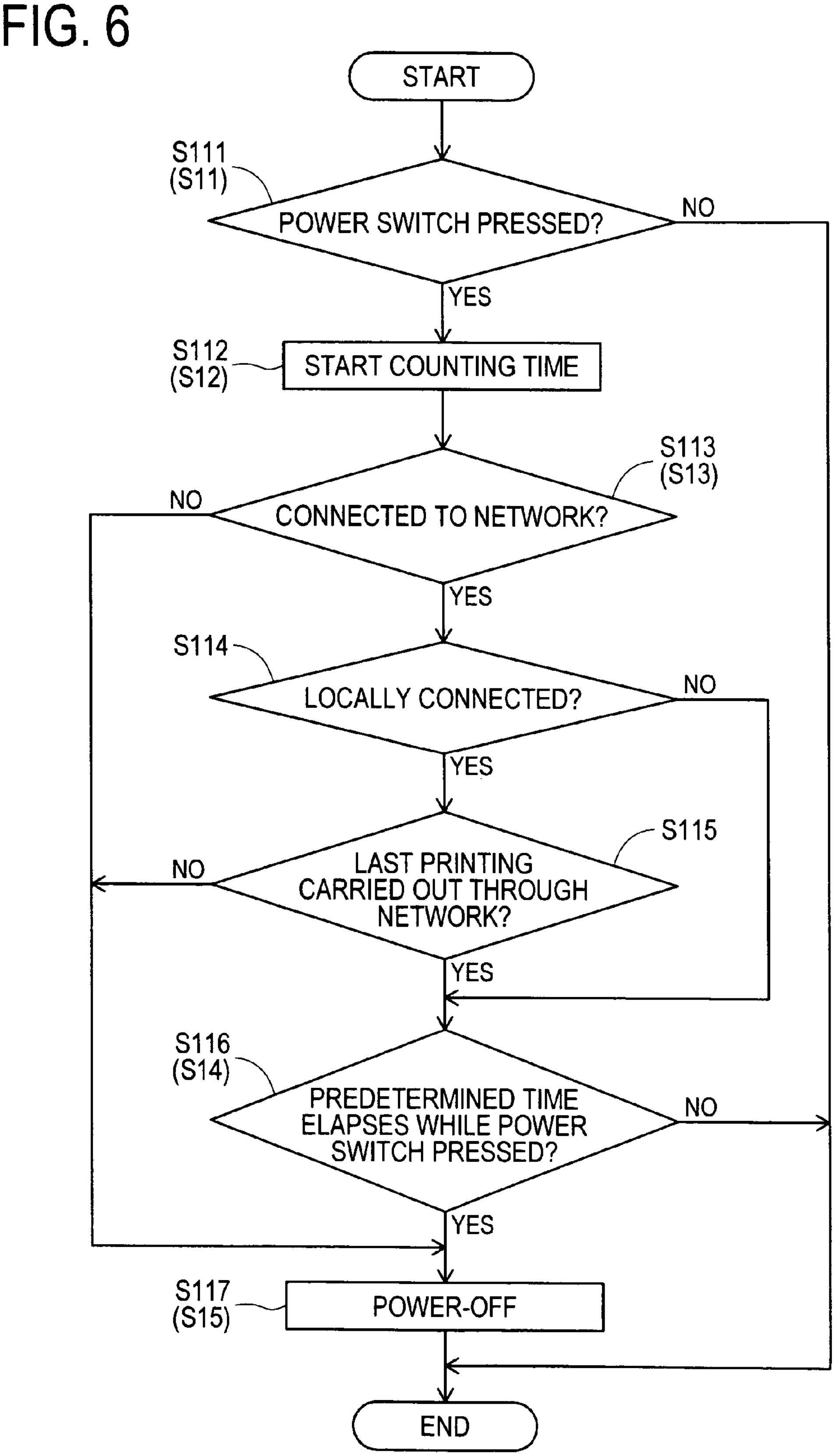
FIG. 6 is a flowchart illustrating a "power-off process" to power-off a tape printer of a second embodiment.

As shown in FIG. 6, in steps S111 to S113, the CPU 35 in the control circuit part 31 executes the process S11 through S13 as mentioned in the first embodiment. Then, if the tape printer 61 is not connected to the LAN 51, that is to say, if the LAN connection signal is not input from the communication control circuit part 33 (S113:NO), the CPU 35 shifts the flow to S117 process to execute S15 process as mentioned in the first embodiment and then finishes the process thereat.

On the other hand, if the tape printer 61 is connected to the LAN 51, that is to say, if the LAN connection signal is input from the communication control circuit part 33 (SI 13: YES), the CPU 35 shifts the flow to S114 process.

At S114, the CPU 35 executes a judgment process to judge whether the tape printer 61 is directly connected to other apparatus like the personal computer 200 through the RS-232C connector part 11 or through the USB connector part 13. In short, the CPU 35 judges whether the local connection signal is input from the communication control circuit part 33.

If the tape printer 61 is not directly connected to other apparatus like the personal computer 200 through the RS-232C connector part 11 or through the USB connector part 13, in short, if the local connection signal is not input from the communication control circuit part 33 (S114: NO), the CPU 35 shifts the flow to S116 process, which will be mentioned later, to execute S14 process as mentioned in the first embodiment.

On the other hand, if the tape printer 61 is directly connected to other apparatus like the personal computer 200 through the RS-232C connector part 11 or through the USB connector part 13, in short, if the local connection signal is input from the communication control circuit part 33 (S114: YES), the CPU 35 shifts the flow to S115 process.

At S115, the CPU 35 carries out a judgment process to judge whether the print data lastly output to the print part 45 is the one obtained from external machines like the server 100 on the LAN 51 through the LAN I/F 42 by using a communication system like TCP/IP.

If the print data lastly output to the print part 45 is the one obtained through the LAN I/F 42, the CPU 35 in the control circuit part 31 sets a print flag in ON-state and saves it in the RAM 37. On the other hand, if the print data output to the print part 45 is the one obtained through the local I/F 41, the CPU 35 sets a print flag in OFF-state and saves it in the RAM 37. Accordingly, the CPU 35 reads out the print flag from the RAM 37. Then, depending on the state of the print flag ON or OFF, the CPU 35 judges whether the print data lastly output to the print part 45 has been obtained from external machines like the server 100 on the LAN 51 through the LAN I/F 42.

If the print data lastly output to the print part 45 has not been obtained from external machines like the server 100 on the LAN 51 through the LAN I/F 42 by using a communication system like TCP/IP, in short, if obtained from other apparatus like the personal computer 200 directly connected to the RS-232C connector part 11 or the USB connector part 13 through the local I/F 41 (S115: NO), the CPU 35 shifts the flow to process S117 to executes process S15 as mentioned in the first embodiment and then finishes the process thereat.

On the other hand, if the print data lastly output to the print part 45 is the one obtained from external machines like the server 100 on the LAN 51 through the LAN I/F 42 by using a communication system like TCP/IP (S115: YES), the CPU 35 shifts the flow to process S116 to carry out the process S14 as mentioned in the first embodiment.

If the predetermined time (for example, about 5 sec.) does not elapse while the power switch 7A is continuously pressed, in short, if the input of the pressing signal from the power switch 7A is discontinued before the time counted by the timer 38 attains the predetermined time (for example, about 5 sec.) (S116: NO), the CPU 35 finishes the process thereat.

On the other hand, if the predetermined time (for example, about 5 sec.) elapses in the state that the power switch 7A is continuously pressed, in short, if the time counted by the timer 38 attains the predetermined time (for example, about 5 sec.) (S116: YES), the CPU 35 shifts the flow to process S117 to carry out the process S15 as mentioned in the first embodiment and then finishes the process thereat.

As was described earlier in detail, in the tape printer 61 of the second embodiment, the CPU 35 in the control circuit part 31 powers off the tape printer 61 when the pressing signal is continuously input during the predetermined time (for example, about 5 sec.) on condition that the tape printer 61 is connected only to the LAN 51 through the LAN cable 12A connected to the LAN connector part 12 and the local I/F 41 is not connected to other apparatus like the personal computer 200. In short, the CPU 35 powers off the tape printer 61 when the pressing signal is continuously input during the predetermined time on condition that only the LAN connection signal is input from the communication control circuit part 33.

Thereby, a user has to keep pressing the power switch 7A during the predetermined time (for example, about 5 sec.) to cut the power source under a situation where the tape printer 61 is connected to only the LAN 51. Therefore unnecessary cuttings of the power source while the tape printer 61 is connected to the network can be effectively prevented. So, it is possible to decrease the number of times of power on operations while the tape printer 61 is connected to the LAN 51 can be reduced. In brief, it is possible to decrease the amount of communication with the server 100 on the LAN 51. Consequently, the traffic can be reduced.

Also, the CPU 35 judges whether the print data lastly printed is the one obtained through the LAN 51 in case the tape printer 61 is connected to both the LAN 51 and other apparatus like the personal computer 200 wherein the former one is connected through the LAN cable 12A connected to the LAN connector part 12 and the latter one is connected through either the RS-232C connector part 11 or through the USB connector part 13. In short, the CPU 35 judges whether the print data lastly printed is the one obtained through the LAN 51 in case both the LAN connection signal and the local connection signal are input from the communication control circuit part 33 (S15).

In case the last print data is the one obtained from the LAN 51 (S115: YES) and the tape printer 61 is connected to other apparatus like the personal computer 200 through the RS-232C connector part 11 or through the USB connector part 13, the tape printer 61 can be configured to cut the power source on condition that the power switch 7A is continuously pressed during the predetermined time (for example, about 5 sec.). Thereby, unnecessary cuttings of the power source while the tape printer 61 is used through the LAN 51 can be effectively prevented. Accordingly, it is possible to decrease the number of times of power-on operations while the tape printer 61 is connected to the LAN 51, and to decrease the amount of communication with the server 100 on the LAN 51. Consequently, the traffic can be reduced.

On the other hand, in case the last print data is the one obtained from other apparatus like the personal computer 200 directly connected through the RS-232C connector part 11 or through the USB connector part 13 (S115:NO), the tape printer 61 can be configured to cut the power source as soon as the power switch 7A is pressed. Thereby, it is possible to cut the power source promptly if the tape printer 61 is directly connected to and used by other apparatus like the personal computer 200.

Also, the tape printer 61 can be configured to cut the power source as soon as the power switch 7A is pressed in case connected directly only to other apparatus through the RS-232C connector part 11 or through the USB connector part 13 and not connected to the LAN 51, that is, if only the local communication signal is input from the communication control circuit part 33. Thereby, the tape printer 61 can be powered off promptly. Also, the power switch 7A can be arranged at the front cover 6, thereby the operability of the tape printer 61 can be improved.

The disclosure is not limited to the above-described embodiments and various improvements and modifications can be made thereto without departing from the spirit of the disclosure.

For instance, as to the manner that the CPU 35 judges whether the predetermined time elapses in the state the power switch 7A is continuously pressed at S14 or S116, a time setting part capable to change the setting of the predetermined time may be provided. There may be provided a setting switch for setting the predetermined time on the control board 26 or the rear portion of the tape printer 1,61. Also, the CPU 35 may change the setting of the predetermined time in this order, that is, about 5 sec.→about 10 sec.→about 15 sec.→about 5 sec.→about 10 sec.→ . . . whenever the power switch 7A and the cut switch 7B are pressed at once. The CPU 35 may store this setting of the predetermined time in the RAM 37.

Thereby, the setting of the predetermined time that a user needs to press continuously the power switch 7A to cut the power source can be changed. Therefore, by setting the predetermined time longer, the user can more certainly prevent unnecessary cutting of the power source when each tape printer 1,61 is connected to the LAN 51.

While presently exemplary embodiments have been shown and described, it is to be understood that this disclosure is for the purpose of illustration and that various changes and modifications may be made without departing from the scope of the disclosure as set forth in the appended claims.

What is claimed is:

1. A tape printer comprising:

a print device for printing print data on a long printing medium;

a connection device capable of connecting to a server via a network;

a direct connection device capable of directly connecting to an apparatus without the network;

an input device for inputting a power-off instruction to instruct power-off of the tape printer;

a connection judgment device for judging whether the tape printer is simultaneously connected to both the server via the network through the connection device when the power-off instruction is input from the input device and the apparatus directly through the direct connection device when the connection judgment device judges that the tape printer is connected to the server via the network;

a print data judgment device for judging whether the print data lastly printed is obtained through the network from the server when the connection judgment device judges that the tape printer is simultaneously connected to both the server via the network through the connection device and the apparatus directly through the direct connection device;

a power-off judgment device for judging whether the power-off instruction is continuously inputted during a predetermined time by maintaining a depression state when the connection judgment device judges that the tape printer is simultaneously connected to both the server via the network through the connection device and the apparatus directly through the direct connection device; and a power source control device for powering off the tape printer when the power-off judgment device judges that the power-off instruction is continuously input during the predetermined time when the print data judgment device determines that the print data lastly printed is obtained through the network from the server.

2. The tape printer according to claim 1, wherein the power-off judgment device judges whether the power-off instruction of the tape printer is continuously input during the predetermined time when the connection judgment device judges that the tape printer is not directly connected to the apparatus through the direct connection device.

3. The tape printer according to claim 1, wherein the power source control device controls the tape printer so as to be powered off when the print data judgment device judges that the print data lastly printed are not obtained through the network from the server.

4. The tape printer according to claim 1, wherein the power source control device controls the tape printer so as to be powered off when the connection judgment device judges that the tape printer is not connected to the server via the network.

5. The tape printer according to claim 1, further comprising a time setting device for changing and setting the predetermined time.

6. A tape printer in which print data are printed on a long tape through a print head, the tape printer comprising:

a power switch for powering on or off the tape printer;

a first connection device capable of connecting to a server via a network;

a second connection device capable of directly connecting to an apparatus without the network;

a timer device for counting a predetermined time since the power switch is pressed; and a controller programmed to (a) judge whether the tape printer is simultaneously connected to both the server via the network through the first connection device and the apparatus directly through the second connection device, (b) judge whether the print data lastly printed is obtained from the server via the network when judged that the tape printer is simultaneously connected to both the apparatus directly and the server via the network, and (c) power off the tape printer after the timer device counts the predetermined time when judged that the print data lastly printed is obtained from the server via the network and judged that the tape printer is connected to both the server via the network and the apparatus directly.

7. The tape printer according to claim 6, wherein the controller immediately powers off the tape printer if judged that the print data lastly printed are not obtained from the server via the network.

8. The tape printer according to claim 6, further comprising:

(d) power off the tape printer immediately when judged that the tape printer is not connected to the server via the network.

* * * * *